(12) United States Patent
Haase et al.

(10) Patent No.: US 10,249,405 B2
(45) Date of Patent: Apr. 2, 2019

(54) ENAMELED WIRE, SPOOL, AND METHOD OF MAKING AN ENAMELED WIRE

(71) Applicant: SCHWERING & HASSE ELEKTRODRAHT GMBH, Luegde (DE)

(72) Inventors: Roxana Haase, Bad Pyrmont (DE); Johann Reicher, Bad Muender (DE)

(73) Assignee: SCHWERING & HESSE ELEKTRODRAHT GMBH, Luegde (DE)

( * ) Notice: Subject to any disclaimer, the term of this patent is extended or adjusted under 35 U.S.C. 154(b) by 33 days.

(21) Appl. No.: 15/308,730

(22) PCT Filed: Oct. 31, 2014

(86) PCT No.: PCT/EP2014/073473
§ 371 (c)(1),
(2) Date: Jun. 22, 2017

(87) PCT Pub. No.: WO2015/176783
PCT Pub. Date: Nov. 26, 2015

(65) Prior Publication Data
US 2018/0012677 A1    Jan. 11, 2018

(30) Foreign Application Priority Data

May 20, 2014 (DE) .......................... 10 2014 107 117

(51) Int. Cl.
*H02K 3/30* (2006.01)
*H01B 3/30* (2006.01)

(52) U.S. Cl.
CPC ............... *H01B 3/305* (2013.01); *H01B 3/30* (2013.01); *H01B 3/306* (2013.01); *H02K 3/30* (2013.01)

(58) Field of Classification Search
CPC .......... H01B 3/30; H01B 3/305; H01B 3/306; H02K 3/30
USPC ...................................................... 174/137 R
See application file for complete search history.

(56) References Cited

U.S. PATENT DOCUMENTS

| | | | | |
|---|---|---|---|---|
| 4,511,624 A | * | 4/1985 | Kawaguchi | H01B 3/302 174/110 SR |
| 5,356,668 A | * | 10/1994 | Paton | A61L 33/0082 427/2.25 |
| 5,422,404 A | * | 6/1995 | Zielinsky | C08C 19/14 525/326.4 |
| 5,688,457 A | * | 11/1997 | Buckmaster | B29C 47/00 264/165 |
| 5,725,953 A | * | 3/1998 | Onishi | H01B 3/303 174/110 FC |
| 7,253,357 B2 | | 8/2007 | Cipelli | |
| 2001/0010269 A1 | * | 8/2001 | Higashiura | H01F 27/323 174/120 R |
| 2011/0192632 A1 | * | 8/2011 | Abe | H01B 3/301 174/120 SR |
| 2013/0153261 A1 | * | 6/2013 | Bremser | C08G 18/0823 174/110 SR |

FOREIGN PATENT DOCUMENTS

JP        58191728 B      5/1983

\* cited by examiner

*Primary Examiner* — Michael F McAllister
(74) *Attorney, Agent, or Firm* — Andrew Wilford

(57) ABSTRACT

Disclosed is an enameled wire comprising a metal wire, in particular a copper wire, which is coated with an electrically insulating varnish containing at least one varnish polymer. Fluorine atoms are bonded to the outer surface of the varnish by substitution or radical substitution as a result of a treatment of the outer surface with fluorine or fluorine gas.

16 Claims, No Drawings

ENAMELED WIRE, SPOOL, AND METHOD OF MAKING AN ENAMELED WIRE

CROSS REFERENCE TO RELATED APPLICATIONS

This application is the US-national stage of PCT application PCT/EP2014/073473 filed 31 Oct. 2014 and claiming the priority of German patent application 102014107117.4 itself filed 20 May 2014.

FIELD OF THE INVENTION

The invention relates to an enameled wire having a metal-wire core, in particular of copper coated with an electrically insulating enamel that contains at least one enamel polymer. Furthermore, the invention relates to a coiled body, in particular a coil or the like that has at least one turn, preferably a plurality of turns of an enameled wire. Furthermore, the invention relates to a method of making an enameled wire. It is within the scope of the invention that the metal wire coated with the electrically insulating enamel or the coiled body formed of this coated metal-wire core is coated with a secondary insulation coating, in particular in the form of a synthetic resin.

BACKGROUND OF THE INVENTION

Enameled wires and coiled bodies formed of enameled wires of the type described above are known in the art in different variants. The electrically insulating enamel coating has at least one enamel polymer or at least one modified enamel polymer. It is also known to apply a secondary insulation coating, in particular in the form of a synthetic resin, to this metal wire coated with the electrically insulating enamel or this enameled wire. The known enameled wires or coiled bodies usually have the disadvantage that the chemical resistance of the surface of the enamel coating leaves something to be desired. For the coatings or enamel coatings of such enameled wires, efforts are first made to achieve a good workability of the coating. A reduction of the surface energy of the material is advantageous for this purpose. On the other hand, such a reduced surface energy causes a relatively poor adhesion of the subsequently applied secondary insulation coating. In order to solve this problem, an adhesion promoter is interposed between the enamel coating (primary insulation) and the secondary insulation coating. In principle, this procedure has led to good results. Nevertheless, the use of an adhesion promoter entails additional material costs.

OBJECT OF THE INVENTION

The object of the invention is to provide an enameled wire of the type described above, but where an optimal chemical resistance of the external surface of the enamel coating can be achieved and furthermore an outstanding adhesion of a secondary insulation coating applied to the enamel coating (primary insulation) is achieved. Furthermore, an object of the invention is to provide a coil body formed of such an enameled wire, as well as a method of making an enameled wire.

SUMMARY OF THE INVENTION

In order to attain this object, the invention first of all discloses an enameled wire having a metal-wire core, in particular of copper and coated with an electrically insulating enamel that contains at least one enamel polymer, the enamel polymer preferably being at least one polymer from the group consisting of polyamide-imide, polyester-imide, polyester-amide imide, polyimide, polyamide, polyester, and polyurethane, fluorine atoms being bonded to the outer surface of the enamel or to the outer surface of an outer enamel layer of the enamel by substitution or radical substitution as a result of a treatment of the outer surface with fluorine or fluorine gas.

It is within the scope of the invention that the fluorination takes place only in the outermost atomic layer or in the outermost atomic layers of the outer surface of the enamel or the outer surface of the outer enamel layer of the enamel. Furthermore, it is within the scope of the invention that, due to the treatment of this outer surface with elemental fluorine or with fluorine gas, fluorine atoms radically substitute the hydrogen atoms at the outer surface. First of all, the invention is based on the recognition that this fluorinated outer surface of the enamel coating of the enameled wire according to the invention has an excellent chemical resistance.

SPECIFIC DESCRIPTION OF THE INVENTION

A particularly preferred embodiment of the enameled wire according to the invention is characterized in that the electrically insulating enamel is applied to the metal wire in a plurality of layers and that the fluorine atoms are bonded to the outer surface of the outer enamel layer. Thus in this embodiment the fluorine atoms are present in the outermost atomic layer or in the outermost atomic layers of the outer enamel layer of the enamel coating of the enameled wire.

A particularly preferred embodiment, which is particularly important within the scope of the invention, is characterized in that the outer surface of the enamel or the outer layer of the enamel includes at least one polyamide-imide as the enamel polymer. The outer surface of the enamel or the outer layer of the enamel preferably includes at least 15 to 25% by weight polyamide-imide. It is particularly preferable within the scope of the invention that the outer surface of the enamel or the outer layer of the enamel includes at least one enamel polymer modified with at least one siloxane or polysiloxane. This enamel polymer is preferably at least one polyamide-imide modified with a siloxane or polysiloxane. Thus the outer surface of the enamel or the outer layer of the enamel preferably includes a polyamide-imide modified with a polysiloxane. In this case preferably 2 to 70% by weight polysiloxane relative to the enamel polymer is used.

According to a preferred embodiment of the invention, the thickness of the electrically insulating enamel applied to the metal wire is 5 μm to 200 μm. Preferably, the thickness of the outer layer of the enamel, more preferably, the thickness of the outer layer with the polyamide-imide or with the polyamide-imide modified with polysiloxane, is 2 μm to 10 μm, more preferably 3 μm to 8 μm.

It is within the scope of the invention that a secondary insulation coating, in particular in the form of a synthetic resin, is applied to the outer surface, or to the outer surface of the enamel that has been fluorinated according to the invention. Advantageously, the outer surface or the fluorinated outer surface of the enamel is impregnated with a liquid synthetic resin as the secondary insulation coating.

According to a particularly preferred embodiment of the invention, the secondary insulation coating has at least one component from the group consisting of polyester-imide resin, polyester resin, silicone resin, silicone-containing plastic, silicone rubber, epoxy resin, polyester-melamine modified resin, polyurethane, alkyd resin, and phenolic resin.

The invention also relates to a coiled body, in particular a coil or the like and preferably provided with a coil core, the coiled body having at least one coil, preferably a plurality of turns, of an enameled wire according to the invention, the coiled enameled wire being provided with an outer surface that contains at least one enamel polymer, fluorine atoms being bonded to this outer surface of the enamel by substitution or by radical substitution as a result of a treatment of the outer surface with fluorine or fluorine gas. Advantageously, the fluorine atoms are present on the outer surface of the coiled enameled wire, or the fluorine atoms are present on the outer surface of the coiled enameled wire that is accessible from the exterior, and are preferably only present on the outer surface of the coiled enameled wire that is accessible from the exterior. It is within the scope of the invention that the fluorination of the outer surface of the enameled wire takes place in the already coiled or coiled-up state of the enameled wire on the coiled body. In this case the fluorination can also take place advantageously in only small openings, pores or the like in the outer surface. Preferably, after this fluorination of the outer surface, or the outer surface accessible from the exterior, the secondary insulation coating already described is applied to the electrically insulating enamel (primary insulation).

Furthermore, the invention relates to a method of making an enameled wire according to the invention, wherein at least one layer of an electrically insulating enamel is applied to a metal wire, in particular a copper wire, subsequently the enameled wire is preferably coiled to form a coiled body, the outer surface of the wire or enameled wire that is coated with the enamel, and preferably coiled, is treated with elemental fluorine or with fluorine gas, so that hydrogen atoms on the outer surface of the enamel or of the at least one enamel polymer are substituted by fluorine atoms. According to a preferred embodiment of the method according to the invention, the fluorination with the elemental fluorine or with the fluorine gas is carried out at a temperature of 15° C. to 30° C. and preferably at room temperature. According to a preferred variant of the method according to the invention, the fluorination with the elemental fluorine or with the fluorine gas takes place at a negative pressure or in a vacuum. Within the scope of the invention, fluorination with fluorine gas also means that fluorine gas is mixed with at least one other gas, for example with nitrogen, and this gas mixture is added for the purpose of fluorination.

According to a preferred embodiment, in the method according to the invention the procedure is as follows:

The coiled bodies that are provided with the enameled wire and are to be fluorinated are introduced into a vacuum chamber.

Then the vacuum chamber is evacuated and, following this, the treatment with fluorine gas takes place. This may advantageously involve a gas mixture of fluorine gas and at least one further gas, for example nitrogen.

After this fluorine treatment, the process gases are advantageously pumped out of the chamber. In this case excess fluorine can be reacted, for example, with the aid of calcium chloride to form calcium fluoride.

Finally, the fluorinated coiled bodies are discharged from the chamber.

This method is advantageously characterized by short cycle times.

It is within the scope of the method according to the invention that a secondary insulation coating, in particular in the form of a synthetic resin, is applied to the fluorinated outer surface of the enamel or of the enameled wire. In this case, a particularly preferred embodiment of the invention is characterized in that both the fluorination and also the subsequent application of the secondary insulation coating take place on the wire or enameled wire that is already coiled to form a coiled body. Preferred components for the secondary insulation coating have already been referred to above.

It is within the scope of the invention that the outer surface of the enameled wire, in particular of the enameled wire that is coiled to form a coiled body, which is fluorinated according to the invention, is impregnated with a liquid secondary insulation coating. Advantageously, a liquid synthetic resin, preferably in the form of one of the components already referred to above, is applied to the fluorinated outer surface of the enameled wire and as a result the outer surface is impregnated with the secondary insulation coating. This results in a particularly outstanding adhesion of the secondary insulation coating to the fluorinated outer surface of the enameled wire.

The invention is based on the recognition that the enameled wire according to the invention, the coiled body according to the invention and the method according to the invention for producing the enameled wire are characterized by particular advantages by comparison with the measures known from the prior art. First of all, the fluorinated outer surface of the electrically insulating enamel (primary insulation) of the enameled wire has a surprisingly high chemical resistance. Moreover, the surface energy of the enamel coating of the enameled wire is significantly increased by the fluorination of the outer surface. Due to the fluorination, first of all a significantly improved wettability of the outer surface is achieved relative to the application of the secondary insulation coating. The increase in the surface energy of the outer surface also gives rise to the considerable advantage that the secondary insulation coating applied to the fluorinated outer surface adheres particularly optimally to the outer surface. This applies, above all, to the enameled wire that is already coiled to form the coiled body and is then fluorinated and subsequently provided with the secondary insulation coating. In this respect, the invention is based on the discovery that, in particular in the coiled state of the enameled wire, the fluorination according to the invention very completely treats the outer surface of the enameled wire that is accessible to the outside, so that the subsequently applied secondary insulation coating can adhere surprisingly firmly at all points on the outer surface of the coiled enameled wire. This adhesion is significantly higher than on outer surfaces that are not fluorinated. It should also be emphasized that the enameled wire according to the invention can be produced relatively simply and cost-effectively. Complex and expensive additional measures are not necessary for this.

The invention claimed is:

1. An enameled wire comprising:
a metal-wire core coated with an electrically insulating enamel that contains at least one enamel polymer that is at least one polymer from the group consisting of polyamide-imide, polyester-imide, polyester-amide imide, polyimide, polyamide, polyester, and polyurethane, fluorine atoms being bonded to an outer surface of the enamel by substitution or by radical substitution as a result of a treatment of the outer surface with fluorine or fluorine gas, the outer surface or an outer layer of the enamel including enamel polymer modified with at least one siloxane or polysiloxane; and a secondary insulation coating applied to the outer surface or to the fluorinated outer surface of the enamel.

2. The enameled wire according to claim 1, wherein the electrically insulating enamel is applied to the metal wire in a plurality of layers and the fluorine atoms are bonded to the outer surface of the outer enamel layer.

3. The enameled wire according to claim 1, wherein the outer surface of the enamel or an outer layer of the enamel includes at least one polyamide-imide as the enamel polymer.

4. The enameled wire according to claim 1, wherein a thickness of the electrically insulating enamel applied to the metal wire is 5 μm to 200 μm, and a thickness of the outer layer of the enamel is 2 μm to 10 μm.

5. The enameled wire according to claim 1, wherein the secondary insulation coating has at least one component from the group consisting of polyester-imide resin, polyester resin, silicone resin, silicone-containing plastic, silicone rubber, epoxy resin, polyester-melamine modified resin, polyurethane, alkyd resin, and phenolic resin.

6. A coiled body provided with a coil core and having a plurality of turns of an enameled wire as defined in claim 1, wherein the coiled enameled wire has an outer surface that contains at least one enamel polymer, and fluorine atoms being bonded to this outer surface of the enamel by substitution or by radical substitution as a result of a treatment of the outer surface with fluorine or fluorine gas; and a secondary insulation coating is applied to the outer surface or to the fluorinated outer surface of the enamel of the coiled enameled wire.

7. A method of making an enameled wire for forming a coil, the method comprising the steps of:

applying at least one layer of an electrically insulating enamel to a metal wire, subsequently coiling the enameled wire to form a coiled body, treating the outer surface of the wire or enameled wire coated with the enamel with elemental fluorine or with fluorine gas, so that hydrogen atoms on the outer surface of the enamel, or of an enamel polymer of the enamel, are substituted by fluorine atoms, and providing the fluorinated outer surface of the wire with a secondary insulation coating.

8. The method according to claim 7, wherein the fluorination of the outer surface of the enamel is carried out at a temperature of 20° C. to 30° C.

9. The method according to claim 7, wherein the fluorination of the enameled wire takes place at a negative pressure or in a vacuum.

10. The method according to claim 7, wherein a liquid synthetic resin is applied as the secondary insulation coating to the fluorinated outer surface.

11. The method according to claim 7, wherein the secondary insulation coating is applied in powder form or as a powder coating to the fluorinated outer surface.

12. The enameled wire according to claim 1, wherein the coil has a metal-wire core of copper.

13. The enameled wire according to claim 1, wherein the secondary insulation coating is of a synthetic resin.

14. The method according to claim 7, wherein the metal wire is of copper.

15. The method according to claim 7, wherein the layer is a synthetic resin.

16. The method according to claim 7, wherein the fluorination and the provision of the secondary insulation layer are done on the wire after coiling.

* * * * *